(12) United States Patent
Huang

(10) Patent No.: US 6,758,042 B2
(45) Date of Patent: Jul. 6, 2004

(54) EXHAUST DEVICE WITH AN ELECTRIC GENERATOR

(76) Inventor: Kuo-Lin Huang, No. 85, Suan-Tou, Suan-Tou Tsun, Liu-Chiao Hsiang, Chia-I Hsien (TW)

(*) Notice: Subject to any disclaimer, the term of this patent is extended or adjusted under 35 U.S.C. 154(b) by 0 days.

(21) Appl. No.: 10/417,454

(22) Filed: Apr. 16, 2003

(65) Prior Publication Data
US 2004/0088977 A1 May 13, 2004

(51) Int. Cl.[7] .......................... F02G 1/00; F02B 33/44; F15D 55/00; F01N 1/18
(52) U.S. Cl. .......................... 60/597; D12/194; 60/624; 60/280
(58) Field of Search .......................... 60/280, 597, 624; D12/194

(56) References Cited

U.S. PATENT DOCUMENTS

| | | | | |
|---|---|---|---|---|
| 1,992,003 A | * | 2/1935 | Cook | 60/280 |
| 5,884,666 A | * | 3/1999 | Johnson | D12/194 |
| 6,343,673 B1 | * | 2/2002 | Chang | 181/227 |
| 6,434,936 B1 | * | 8/2002 | Singh | 60/597 |
| 6,470,680 B1 | * | 10/2002 | Janeke | 60/597 |

* cited by examiner

Primary Examiner—Sheldon J. Richter
(74) Attorney, Agent, or Firm—Ostrolenk, Faber, Gerb & Soffen, LLP

(57) ABSTRACT

An exhaust device includes a housing, a drive unit, and an electric generator. The housing includes a tubular wall with a tube axis, and a mounting wall transverse to the tube axis. The tubular wall has an inlet end portion to be connected to a source of exhaust gas. The housing is formed with a vent for discharging the exhaust gas. The drive unit includes a drive shaft disposed in the housing, and an impeller connected to the drive shaft such that the exhaust gas received from the source can drive rotation of the drive shaft. The electric generator includes a stator mounted on the mounting wall, and a rotor coupled to the drive shaft such that the rotor is rotatable with the drive shaft relative to the stator to generate electricity for operating a load, such as a lamp unit.

12 Claims, 6 Drawing Sheets

EXHAUST DEVICE WITH AN ELECTRIC GENERATOR

BACKGROUND OF THE INVENTION

1. Field of the Invention

The invention relates to an exhaust device, more particularly to an exhaust device with an electric generator for operating a load, such as a lamp unit.

2. Description of the Related Art

Referring to FIG. 1, a conventional exhaust device with a light-emitting capability is shown to be adapted to be mounted on an exhaust pipe 10 of a vehicle. The exhaust device includes an inner tube 11 disposed to surround the exhaust pipe 10, an outer tube 12 surrounding the inner tube 11, and first and second annular members 13, 14 disposed between the inner and outer tubes 11, 12. The first and second annular members 13, 14 are spaced apart from each other, and the first annular member 13 is closer to the distal end of the exhaust pipe 10 as compared to the second annular member 14. The first and second annular members 13, 14 further define a space 17 stuffed with high-temperature stuffing material. A lamp unit includes a set of lamps 15 mounted on the first annular member 13 and spaced angularly apart from each other. The lamps 15 are connected to a power source, such as a car battery, through the use of electrical wires 16 to permit operation of the same.

The following are some of the drawbacks of the aforesaid conventional exhaust device:

1. It is noted that the lamps 15 are connected to the power source of the vehicle through the electrical wires 16. The electrical wires 16 are usually connected to a rear taillight or a brake light of the vehicle so that power can be supplied to the lamps 15. As such, when the electrical wires 16 are exposed from the vehicle body, they will have an adverse affect on the appearance of the latter. On the other hand, if the electrical wires 16 are hidden within the vehicle body, difficulties in the installation of the exhaust device will be encountered.

2. Since the lamps 15 are fixed on the first annular member 13, the light-emitting effect is static and monotonous. Although it is feasible to render a dynamic light-emitting effect with the use of an electronic lamp controller, additional costs are incurred.

SUMMARY OF THE INVENTION

Therefore, the object of the present invention is to provide an exhaust device with an electric generator for operating a load, such as a lamp unit, so as to overcome the afore said drawbacks of the prior art.

Accordingly, an exhaust device of this invention comprises:

- a housing including a tubular wall with a tube axis, the tubular wall having an inlet end portion adapted to be connected to a source of exhaust gas, and a generator confining portion opposite to the inlet end portion along the tube axis, the housing further including a mounting wall disposed in the generator confining portion and transverse to the tube axis, the mounting wall having a first side facing toward the inlet end portion and a second side opposite to the first side along the tube axis, the mounting wall being formed with a shaft hole through the first and second sides, the shaft hole being aligned with the tube axis, at least one of the tubular wall and the mounting wall being formed with a vent so that the exhaust gas received from the source at the inlet end portion can be discharged from the housing;
- a drive unit including a drive shaft disposed in the housing, the drive shaft extending along and being rotatable about the tube axis and having an inner shaft section and an outer shaft section that extends through the shaft hole in the mounting wall, the drive unit further including an impeller disposed in the housing proximate to the inlet end portion and connected to the inner shaft section such that the exhaust gas received from the source at the inlet end portion can drive rotation of the drive shaft; and
- an electric generator including a stator mounted on the second side of the mounting wall and a rotor coupled to the outer shaft section of the drive shaft such that the rotor is rotatable with the drive shaft relative to the stator so as to generate electricity.

Preferably, a lamp unit is connected electrically to and is powered by the electric generator such that the exhaust device is capable of emitting light.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
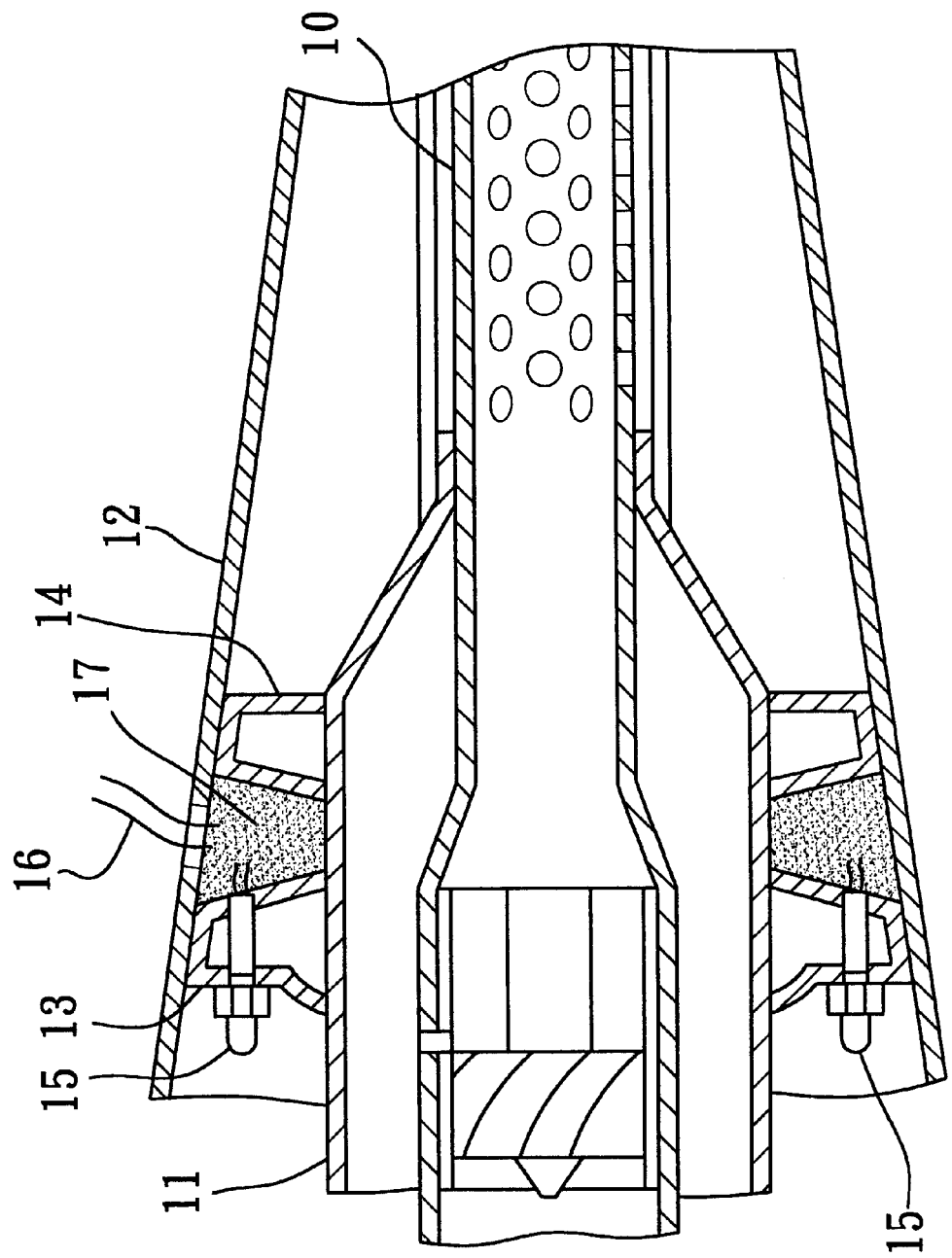
FIG. 1 is a schematic sectional view showing a conventional exhaust device with a light-emitting capability.
Figure 2:
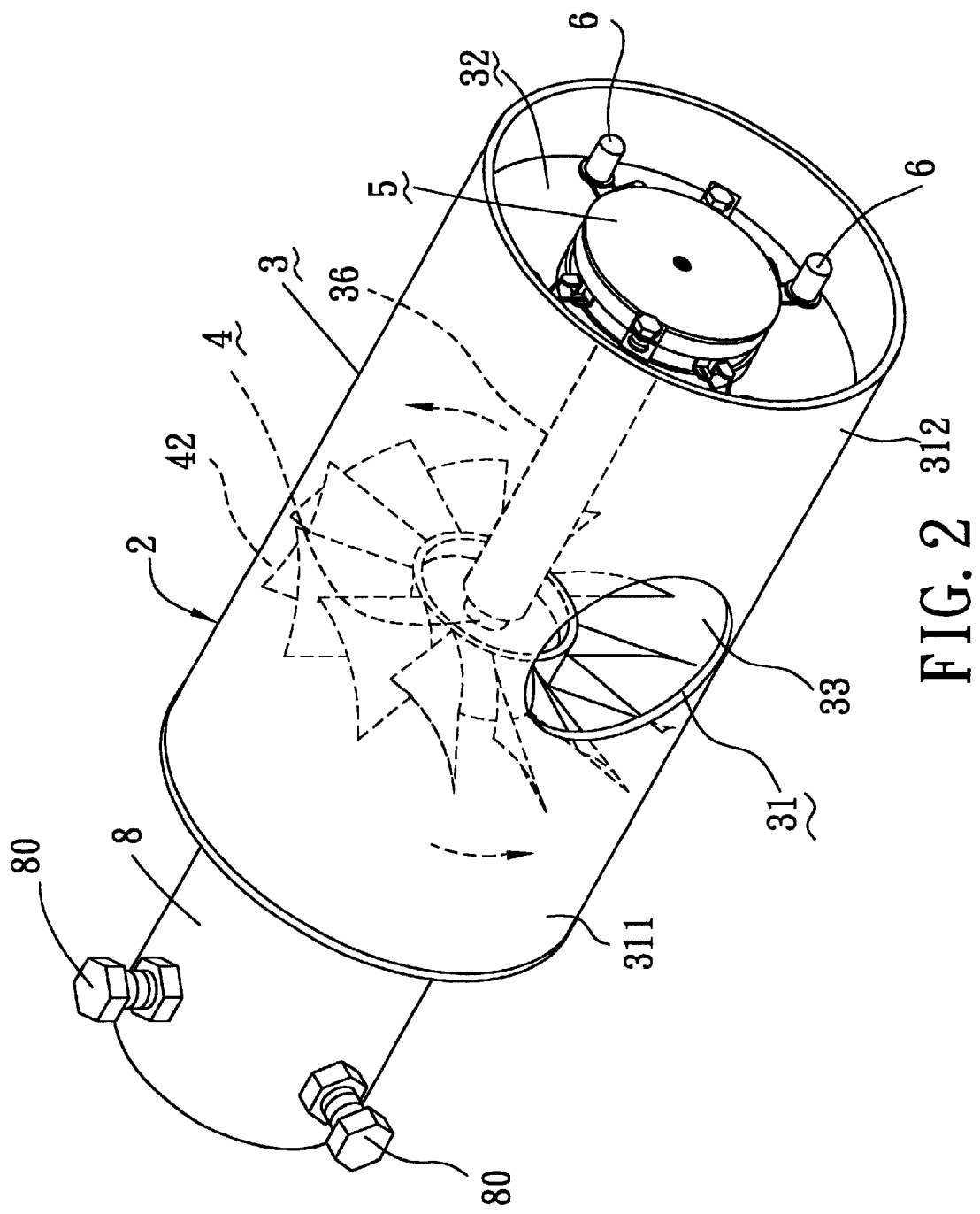
FIG. 2 is an assembled perspective view of the first preferred embodiment of an exhaust device according to the present invention.
Figure 3:
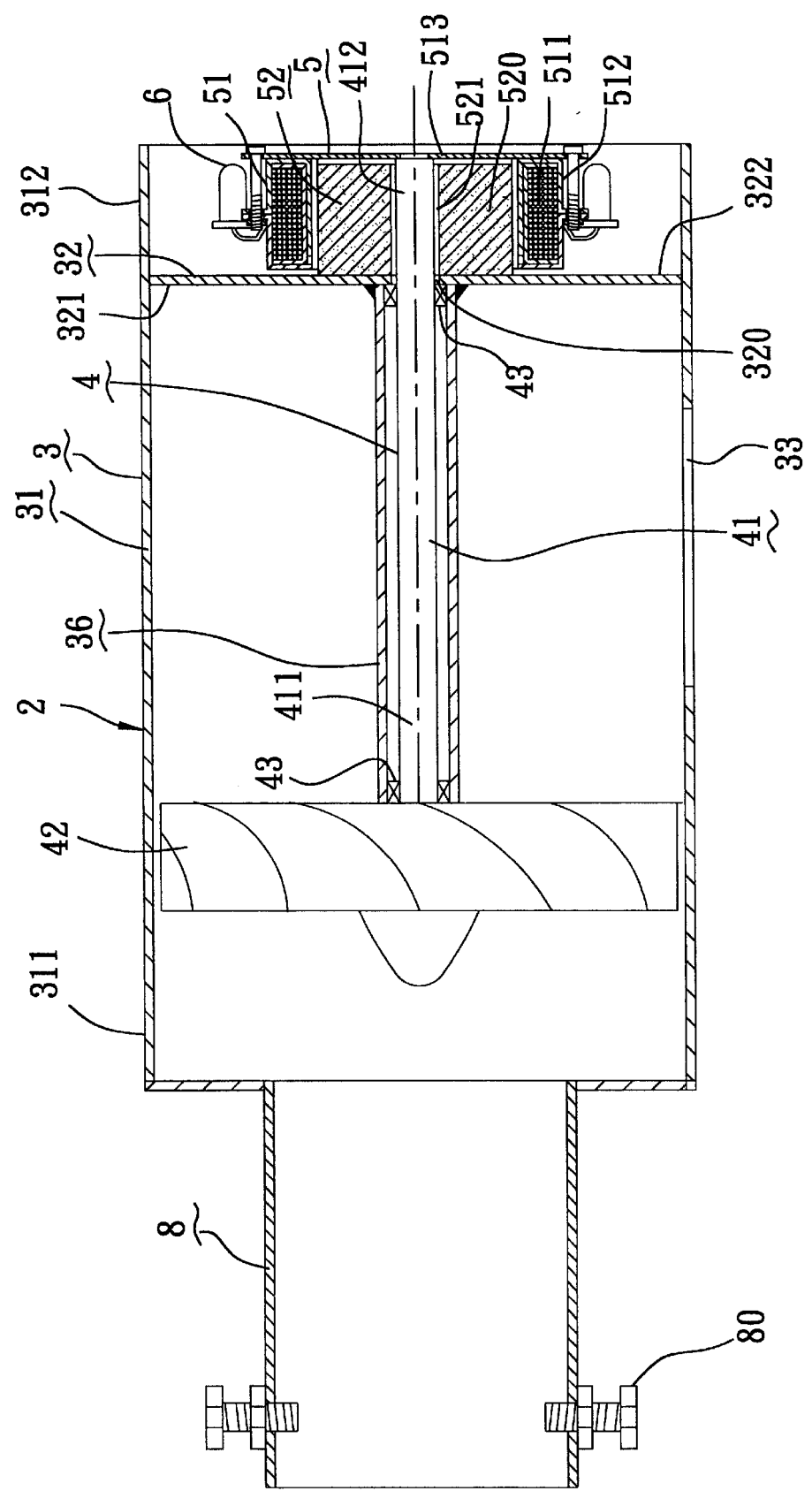
FIG. 3 is a schematic sectional view of the first preferred embodiment.

Referring to FIGS. 2 and 3, the first preferred embodiment of an exhaust device 2 according to the present invention is shown to include a housing 3, a drive unit 4, an electric generator 5, and a lamp unit.

The housing 3 includes a tubular wall 31 and amounting wall 32. The tubular wall 31 defines a tube axis, and includes an inlet end portion 311 adapted to be connected to a source of exhaust gas, and a generator confining portion 312 opposite to the inlet end portion 311 along the tube axis. The mounting wall 32 is disposed in the generator confining portion 312, is transverse to the tube axis, and has a first side 321 facing toward the inlet end portion 311, and a second side 322 opposite to the first side 321 along the tube axis. The mounting wall 32 is further formed with a shaft hole 320 that extends through the first and second sides 321, 322 and that is aligned with the tube axis. In this embodiment, the tubular wall 31 is formed with a vent 33 adjacent to the generator confining portion 312 so that the exhaust gas received from the source at the inlet end portion 311 can be discharged from the housing 31. The housing 3 further includes a shaft mounting tube 36 that has one end connected to the first side 321 of the mounting wall 32 and that extends from the mounting wall 32 along the tube axis toward the inlet end portion 311. Moreover, the inlet end portion 311 has a coupling pipe section 8 adapted to be sleeved on the source of the exhaust gas, such as the exhaust pipe of a vehicle (not shown). Screw fasteners 80 fasten removably the coupling pipe section 8 to the source of the exhaust gas. In a modified embodiment, the inlet end portion 311 is welded directly to the source of the exhaust gas to dispense with the need for the coupling pipe section 8 and the fasteners 80.

The drive unit 4 includes a drive shaft 41 disposed in and extending through the shaft mounting tube 36 of the housing 31. The drive shaft 41 is rotatable about the tube axis, and has an inner shaft section 411 and an outer shaft section 412 that extends through the shaft hole 320 in the mounting wall 32. The drive unit 4 further includes an impeller 42 disposed in the housing 3, proximate to the inlet end portion 311, and connected to the inner shaft section 411 such that the exhaust gas received from the source at the inlet end portion 311 can drive rotation of the drive shaft 41. The drive unit 4 further includes a pair of shaft bearings 43, each of which is mounted in one end of the shaft mounting tube 36 to ensure smooth rotation of the drive shaft 41.

Figure 4:
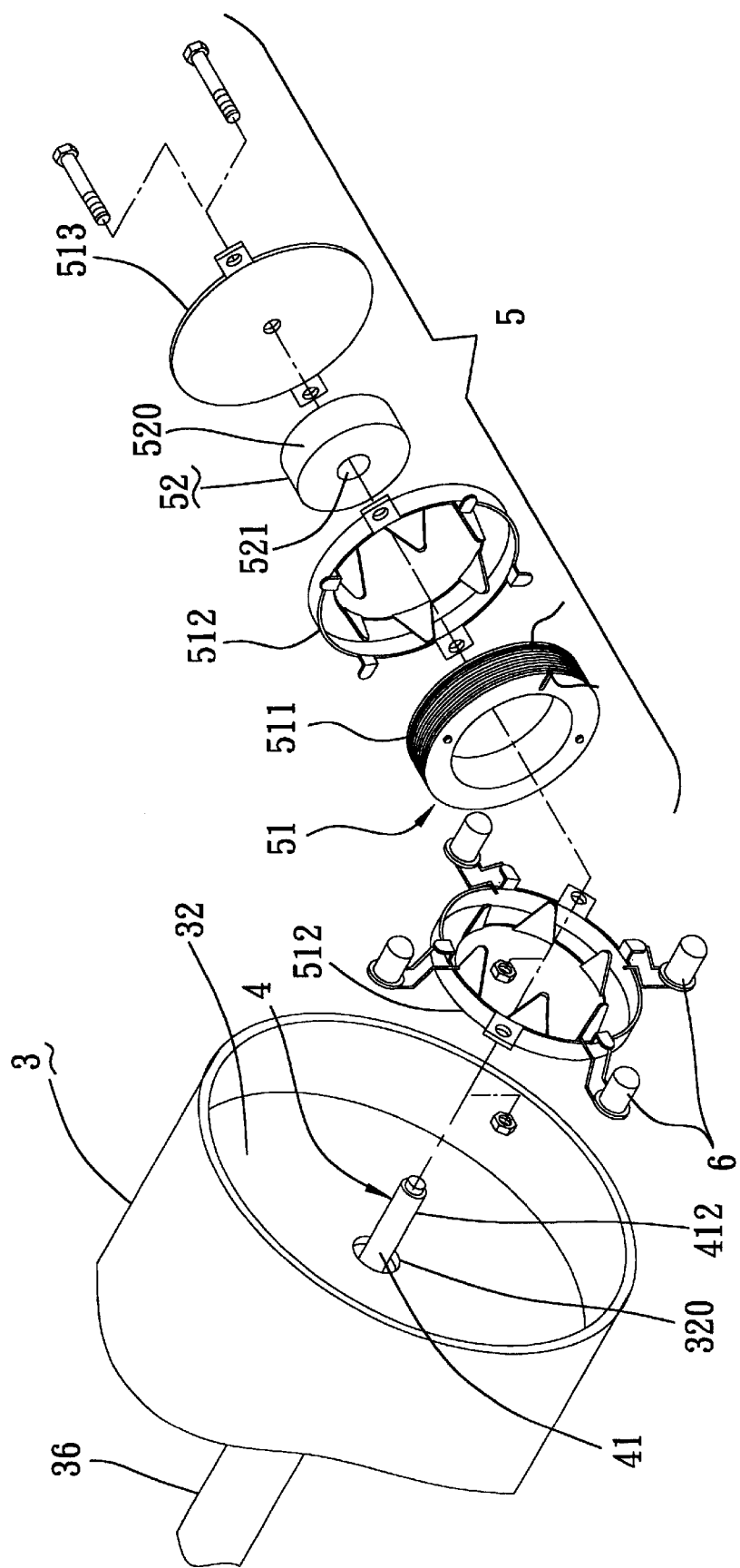
FIG. 4 is a fragmentary exploded perspective view to illustrate an electric generator of the first preferred embodiment.

As shown in FIGS. 3 and 4, the electric generator 5 includes a stator 52 mounted on the second side 322 of the mounting wall 32, and a rotor 51 coupled to the outer shaft section 412 of the drive shaft 41 such that the rotor 51 is rotatable with the drive shaft 41 relative to the stator 52 so as to generate electricity. In this embodiment, the stator 52 includes a magnet member 520 formed with a through hole 521 that has a diameter larger than that of the drive shaft 41. Accordingly, the outer shaft section 412 extends through the through hole 521 and does not drive rotation of the stator 52. The rotor 51 includes a coil device 511, a pair of conductive caps 512, and a mounting plate 513. The coil device 511 includes a spool that surrounds the magnet member 520, and a coil that is wound around the spool. The conductive caps 512 are capped on the coil device 511, and are connected electrically and respectively to opposite ends of the coil of the coil device 511. The mounting plate 513 is fastened to the conductive caps 512, and is connected fixedly to a distal end of the outer shaft section 412 of the drive shaft 41.

The lamp unit is connected electrically to and is powered by the electric generator 5. In this embodiment, the lamp unit includes a set of light-emitting diodes 6 having lamp terminals connected electrically and respectively to the conductive caps 512.

In use, the exhaust gas generated by the source, such as when a vehicle engine is in a running state, enters into the inlet end portion 311, drives rotation of the drive unit 4, and is discharged through the vent 33. Rotation of the drive shaft 41 results in corresponding rotation of the rotor 51 in view of the connection among the outer shaft section 412, the mounting plate 513, and the conductive caps 512. Since the stator 52 is mounted fixedly on the second side 322 of the mounting wall 32, an induced current is generated, which is supplied to the diodes 6 in order to enable the latter to emit light that exits the housing 3 at the generator confining portion 312. In this embodiment, since the diodes 6 are connected to the conductive caps 512, the diodes 6 rotate with the rotor 51 to render a dynamic light-emitting effect.

Figure 5:
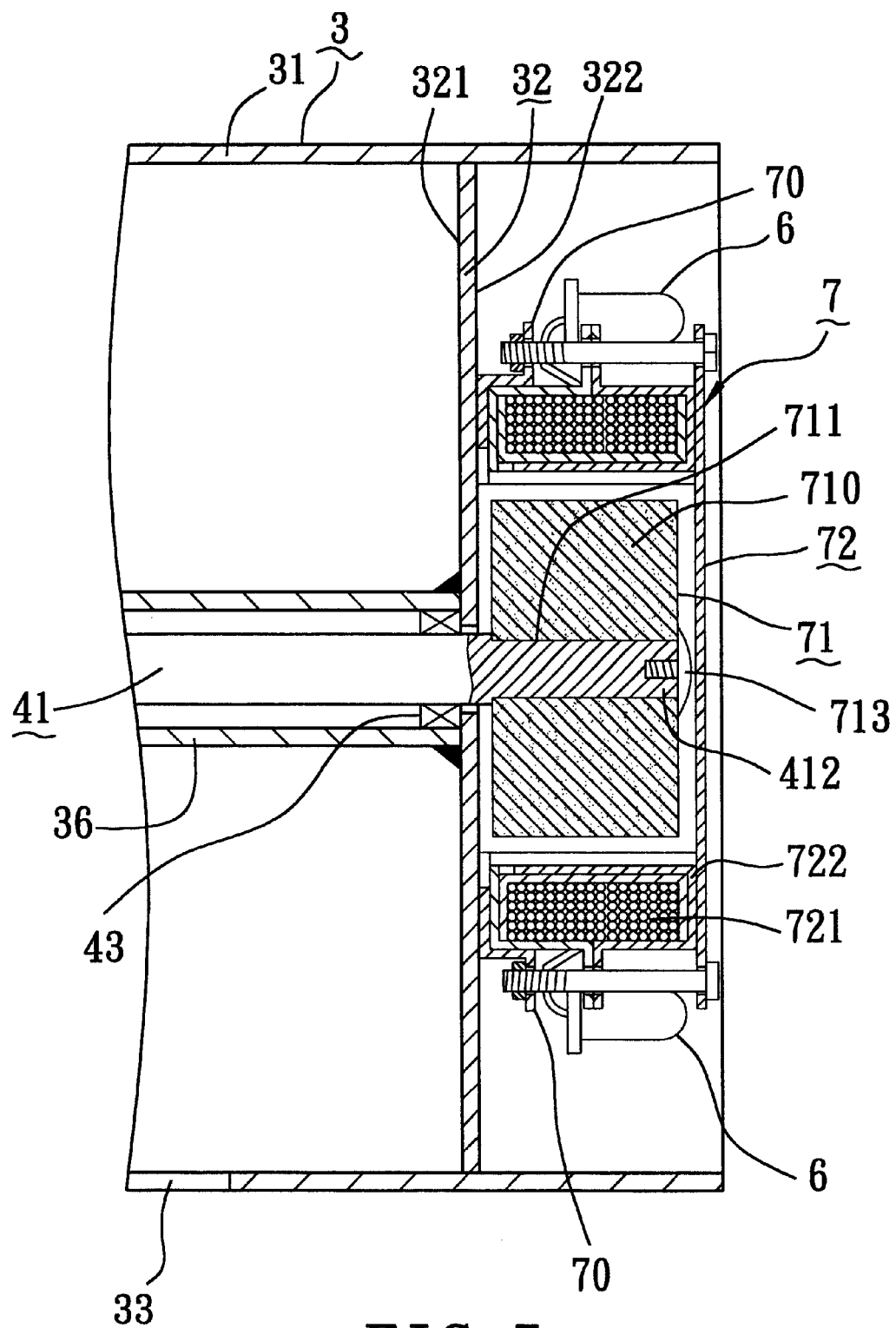
FIG. 5 is fragmentary schematic sectional view of the second preferred embodiment of an exhaust device according to the present invention.

FIG. 5 illustrates the second preferred embodiment of an exhaust device according to the present invention. Unlike the previous embodiment, the rotor 71 of the electric generator 7 includes a magnet member 710 formed with a non-circular through hole 711. The stator 72 of the electric generator 7 includes the coil device 721 that surrounds the magnet member 710, and the pair of conductive caps 722 that are capped on the coil device 721. Fastening devices 70 mount the conductive caps 722 fixedly on the second side 322 of the mounting wall 32 of the housing 3. The diodes 6 are connected to the conductive caps 722 of the stator 72 in a manner similar to the previous embodiment. The outer shaft section 412 of the drive shaft 41 extends through the through hole 711 in the magnet member 710 and is secured to the magnet member 710 by a fastener 713 such that the magnet member 710 rotates with the drive shaft 41.

As such, since the stator 72 is mounted fixedly on the second side 322 of the mounting wall 32, rotation of the rotor 71 with the drive shaft 41 results in the generation of an induced current, which is supplied to the diodes 6 in order to enable the latter to emit light. In this embodiment, since the diodes 6 are connected to the conductive caps 722 of the stator 72, the diodes 6 do not rotate with the drive shaft 41 so that the dynamic light-emitting effect will not be rendered.

Figure 6:
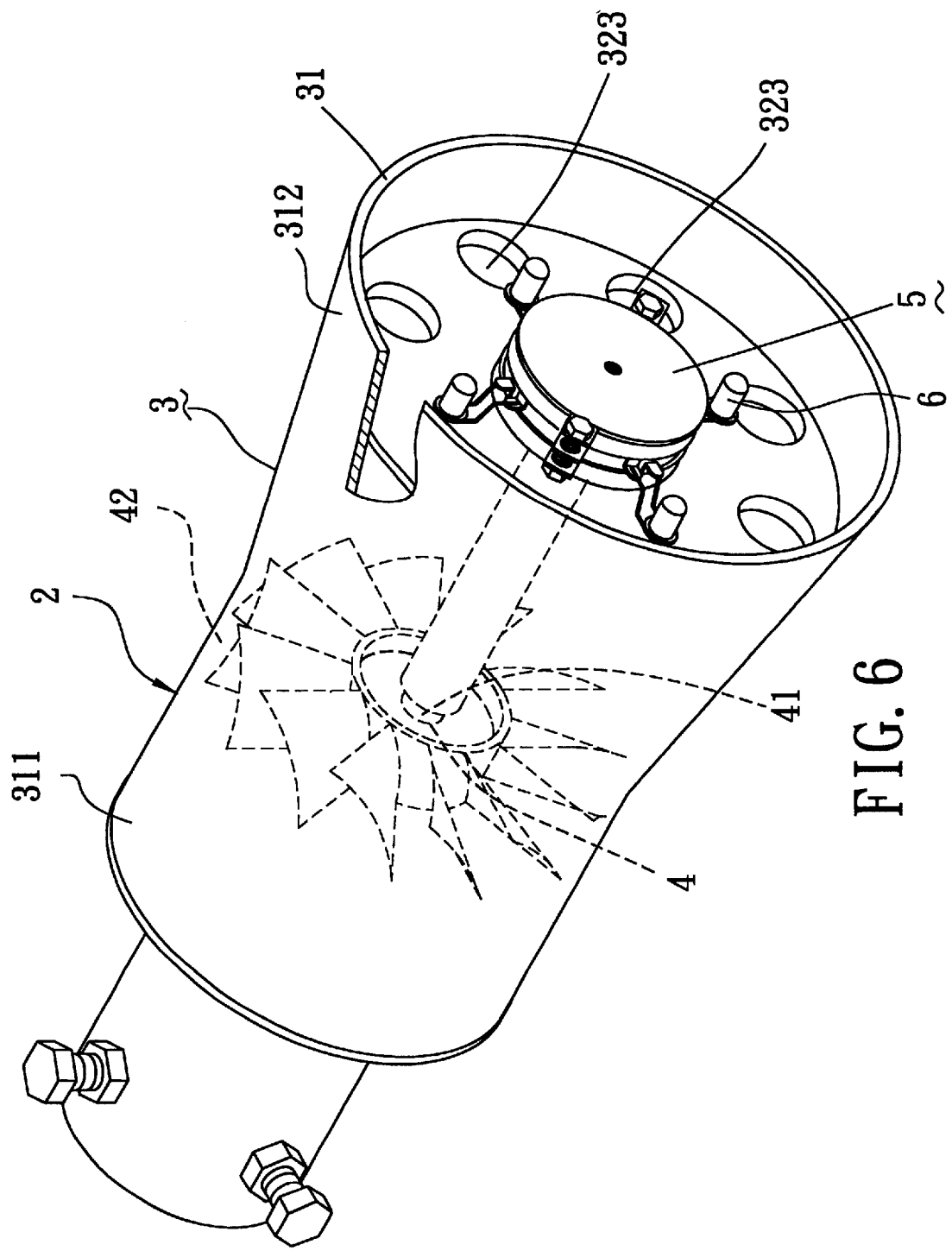
FIG. 6 is an assembled perspective view of the third preferred embodiment of an exhaust device according to the present invention.

FIG. 6 illustrates the third preferred embodiment of an exhaust device 2 according to the present invention. As compared to the first preferred embodiment, the generator confining portion 312 gradually diverges in a direction away from the inlet end portion 311. Moreover, the mounting wall 32 is formed with a set of the vents 323 that permit the discharge of exhaust gas from the housing 3.

Since the exhaust device 2 of this invention includes a self-contained electric generator 5, 7, the installation and appearance problems commonly associated with the use of electrical wires in the prior art can be eliminated. Moreover, in the first preferred embodiment of this invention, a dynamic light-emitting effect can be achieved without the need for an additional electronic controller.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An exhaust device comprising:
    a housing including a tubular wall with a tube axis, said tubular wall having an inlet end portion adapted to be connected to a source of exhaust gas, and a generator confining portion opposite to said inlet end portion along said tube axis, said housing further including a mounting wall disposed in said generator confining portion and transverse to said tube axis, said mounting wall having a first side facing toward said inlet end portion and a second side opposite to said first side along said tube axis, said mounting wall being formed with a shaft hole through said first and second sides, said shaft hole being aligned with said tube axis, at least one of said tubular wall and said mounting wall being formed with a vent so that the exhaust gas received from the source at said inlet end portion can be discharged from said housing;
    a drive unit including a drive shaft disposed in said housing, said drive shaft extending along and being rotatable about said tube axis and having an inner shaft section and an outer shaft section that extends through said shaft hole in said mounting wall, said drive unit further including an impeller disposed in said housing proximate to said inlet end portion and connected to said inner shaft section such that the exhaust gas received from the source at said inlet end portion can drive rotation of said drive shaft; and an electric generator including a stator mounted on said second side of said mounting wall and a rotor coupled to said outer shaft section of said drive shaft such that said rotor is rotatable with said drive shaft relative to said stator so as to generate electricity.

2. The exhaust device as claimed in claim 1, further comprising a lamp unit connected electrically to and powered by said electric generator.

3. The exhaust device as claimed in claim 1, wherein said vent is formed in said tubular wall and is disposed adjacent to said generator confining portion.

4. The exhaust device as claimed in claim 1, wherein said mounting wall is formed with a set of said vents.

5. The exhaust device as claimed in claim 1, wherein said generator confining portion gradually diverges in a direction away from said inlet end portion.

6. The exhaust device as claimed in claim 1, wherein said housing further includes a shaft mounting tube that has one end connected to said first side of said mounting wall, that extends from said mounting wall along said tube axis toward said inlet end portion, and that has said drive shaft extending therethrough.

7. The exhaust device as claimed in claim 1, wherein said stator includes a magnet member, and said rotor includes a coil device that surrounds said magnet member.

8. The exhaust device as claimed in claim 7, further comprising a lamp unit connected electrically to and co-rotatable with said rotor.

9. The exhaust device as claimed in claim 1, wherein said rotor includes a magnet member, and said stator includes a coil device that surrounds said magnet member.

10. The exhaust device as claimed in claim 9, further comprising a lamp unit connected electrically to said stator.

11. The exhaust device as claimed in claim 1, wherein said housing is adapted to be connected removably to the source of the exhaust gas.

12. The exhaust device as claimed in claim 11, wherein said inlet end portion has a coupling pipe section adapted to be sleeved on the source of the exhaust gas, said exhaust device further comprising a fastener adapted to fasten removably said coupling pipe section to the source of the exhaust gas.

* * * * *